(12) United States Patent
Natsume et al.

(10) Patent No.: US 7,893,865 B2
(45) Date of Patent: Feb. 22, 2011

(54) VEHICULAR LAMP

(75) Inventors: Kazunori Natsume, Shizuoka (JP);
Hironori Tsukamoto, Shizuoka (JP);
Yoshiaki Aiso, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 179 days.

(21) Appl. No.: 12/391,869

(22) Filed: Feb. 24, 2009

(65) Prior Publication Data
US 2009/0219191 A1 Sep. 3, 2009

(30) Foreign Application Priority Data
Feb. 28, 2008 (JP) ............................. 2008-047478

(51) Int. Cl.
*G01S 13/58* (2006.01)
(52) U.S. Cl. ................. 342/109; 342/104; 342/118; 362/507
(58) Field of Classification Search .......... 342/104–146
See application file for complete search history.

(56) References Cited

U.S. PATENT DOCUMENTS
2004/0012973 A1* 1/2004 Baker et al. ................. 362/464

2008/0158045 A1* 7/2008 Teranishi et al. .............. 342/70
2008/0180965 A1* 7/2008 Nakamura et al. .......... 362/507

FOREIGN PATENT DOCUMENTS
JP     2001-236803 A     8/2001

OTHER PUBLICATIONS

English abstract of JP2001236803 published on Aug. 31, 2001, esp@cenet database, 1 page.

* cited by examiner

*Primary Examiner*—Thomas H Tarcza
*Assistant Examiner*—Timothy A Brainard
(74) *Attorney, Agent, or Firm*—Osha • Liang LLP

(57) ABSTRACT

A vehicular lamp includes a lamp chamber formed by a lamp body opening forward and a transparent front cover attached to a forward opening portion thereof; a lamp unit disposed within the lamp chamber; a millimeter wave radar for sending a millimeter wave to reflect off of an object in order to detect a distance and a relative speed of the object; and a millimeter wave direction-changing mechanism for sending forward the millimeter wave sent by the millimeter wave radar from a back surface side of the lamp unit, without reflecting the millimeter wave on a rearward side of the lamp unit.

17 Claims, 3 Drawing Sheets

VEHICULAR LAMP

BACKGROUND OF INVENTION

1. Field of the Invention

The present invention relates to a vehicular lamp provided with a millimeter wave radar that sends a millimeter wave to an object off which the millimeter wave reflects in order to detect a distance and a relative speed.

2. Related Art

A vehicular lamp wherein a laser radar mechanism is mounted on a panel of a headlight housing excluding a reflector is known as an example of a vehicular lamp according to related art (see Patent Document 1).

[Patent Document 1]

Japanese Patent Application Laid-Open (Kokai) No. 2001-236803

SUMMARY OF INVENTION

However, according to the vehicular lamp disclosed in Patent Document 1, the laser radar mechanism is arranged at the front of the lamp, which makes it difficult to distribute space between the laser radar mechanism and a light source, and, further, makes it difficult to secure space for the laser radar mechanism.

Placing the laser radar mechanism at the front of the lamp is also less than satisfactory in terms of a style that takes into account the frontal design.

One or more embodiments of the present invention provide a vehicular lamp capable of securing space while also ensuring a good design.

One or more embodiments of the present invention relate to a vehicular lamp having a lamp unit within a lamp chamber that is formed by a lamp body opening forward and a transparent front cover attached to a forward opening portion thereof, and a millimeter wave radar for sending a millimeter wave to an object off which the millimeter wave reflects in order to detect a distance and a relative speed. The vehicular lamp is characterized by including a millimeter wave direction-changing mechanism for sending forward the millimeter wave sent by the millimeter wave radar from a back surface side of the lamp unit, without reflecting the millimeter wave on a rearward side of the lamp unit.

According to the vehicular lamp with the above structure, the millimeter wave sent from the millimeter wave radar can be sent forward by the millimeter wave direction-changing mechanism from the back surface side of the lamp unit via space between the lamp units. Therefore, the millimeter wave radar can be provided at a position on a lower portion or back surface of the lamp chamber so as to be invisible when viewed from the front, and the millimeter wave can be sent from a narrow opening rearward of the lamp unit. Accordingly, it is simple to distribute space between the lamp unit and the millimeter wave radar, and space can be easily secured, thereby achieving a more compact vehicular lamp and also a good design where the millimeter wave radar cannot be seen when viewed from the front.

In the vehicular lamp with the above structure, the millimeter wave direction-changing mechanism preferably has a reflective plate that reflects the millimeter wave sent by the millimeter wave radar.

According to the vehicular lamp with such a structure, the millimeter wave radar is disposed at a position on the lower portion or back surface of the lamp chamber so as to be invisible when viewed from the front. Furthermore, the millimeter wave can be sent from a narrow opening rearward of the tamp unit and given directionality via the reflective plate. Thus, it is possible to generate a millimeter wave with directionality and dispose the millimeter wave radar at a location where there is flexibility in terms of space.

In the vehicular lamp with the above structure, the millimeter wave direction-changing mechanism preferably has a waveguide that guides the millimeter wave sent by the millimeter wave radar.

According to the vehicular lamp with such a structure, the millimeter wave radar is disposed at a position on the lower portion or back surface of the lamp chamber so as to be invisible when viewed from the front. Furthermore, the millimeter wave can be sent from a narrow opening rearward of the lamp unit and given directionality via the waveguide. Thus, it is possible to generate a millimeter wave with directionality and dispose the millimeter wave radar at a location where there is flexibility in terms of space.

In the vehicular lamp with the above structure, it is preferable that a plurality of lamp units is arranged, and the reflective plate is provided between the lamp units and the millimeter wave radar, wherein the millimeter wave sent by the millimeter wave radar is sent forward by the reflective plate via space between the lamp units.

According to the vehicular lamp with such a structure, providing the reflective plate between the plurality of arranged lamp units and the millimeter wave radar enables the reflective plate to give directionality to the millimeter wave sent by the millimeter wave radar and send forward the millimeter wave via space between the lamp units. Thus, since the reflective plate is provided between the plurality of lamp units and the millimeter wave radar, the millimeter wave sent from the millimeter wave laser does not directly impact the lamp unit, and the reflective plate can efficiently give directionality to the millimeter wave.

With the vehicular lamp according to one or more embodiments of the present invention, it is possible to provide a vehicular lamp that accommodates a lamp unit within a lamp chamber formed from a lamp body and a front cover, and includes a millimeter radar that sends a millimeter wave to reflect off of an object in order to detect a distance and a relative speed of the object wherein the vehicular lamp is capable of securing space while also ensuring a good design.

Other aspects and advantages of the invention will be apparent from the following description, the drawings and the claims.

DETAILED DESCRIPTION

Embodiments of the present invention will be described below with reference to the drawings.

First Embodiment

Figure 1:
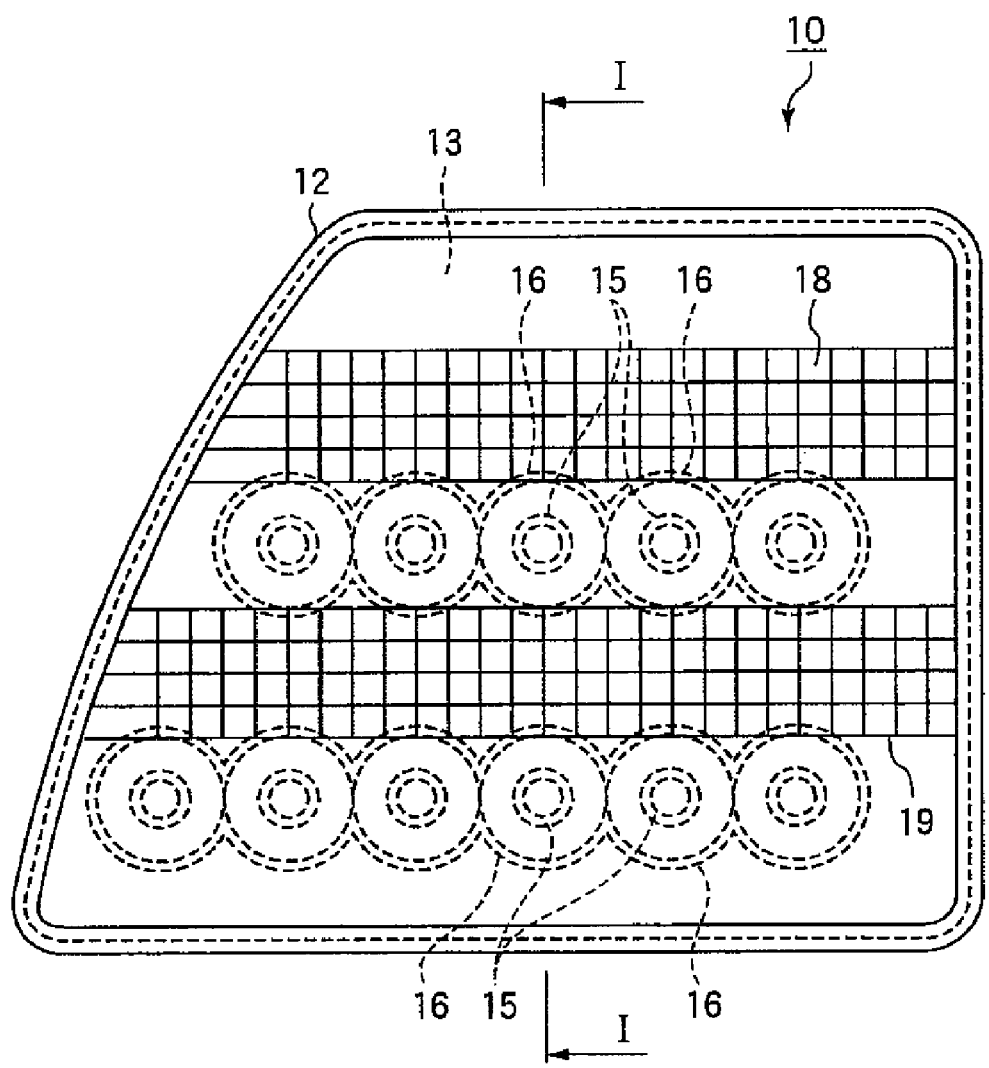
FIG. 1 is a frontal view of a vehicular lamp according to a first embodiment of the present invention.
Figure 2:
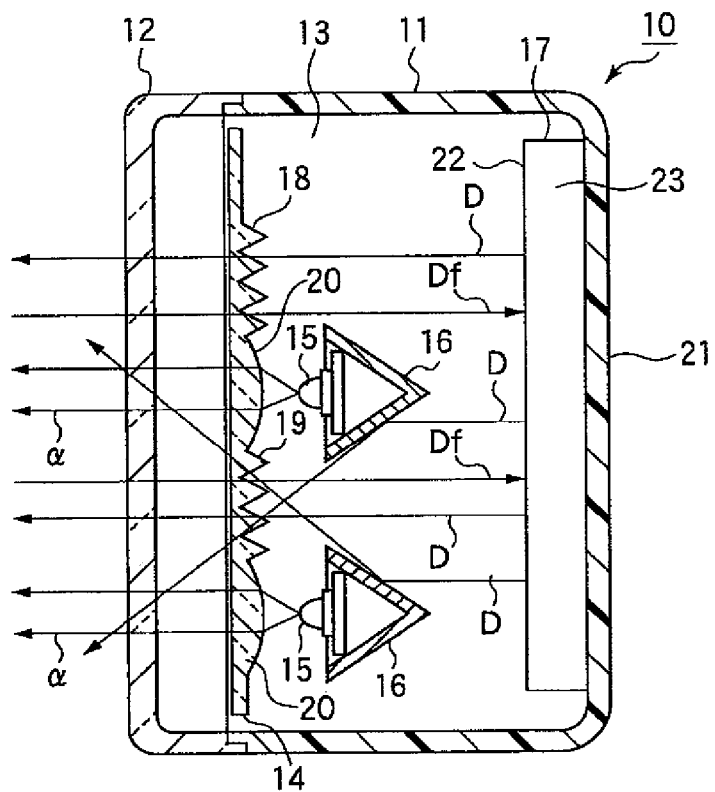
FIG. 2 is a cross-sectional view taken along a line I-I in FIG. 1.
Figure 3:
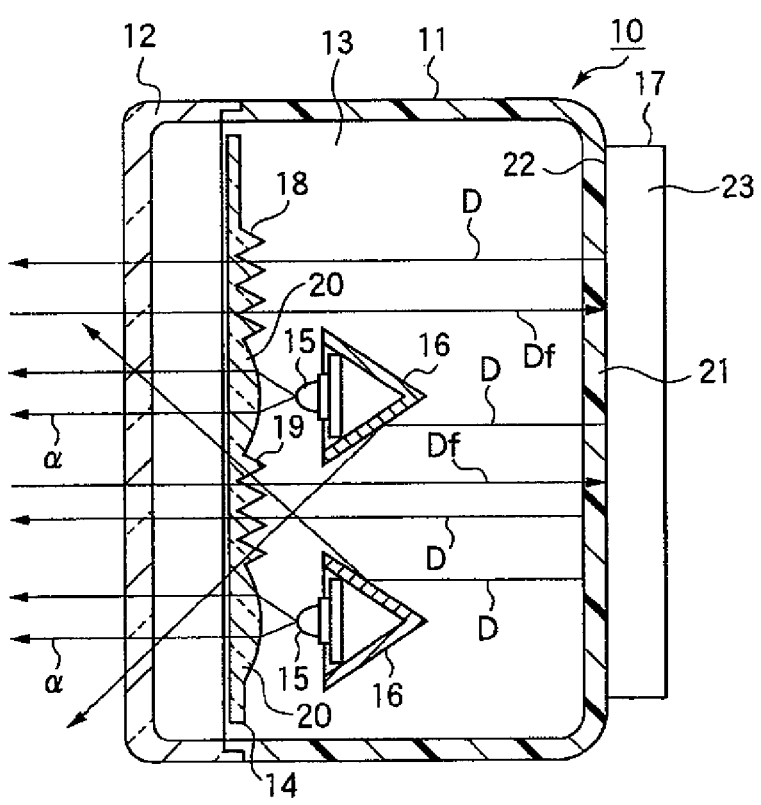
FIG. 3 is a cross-sectional view showing a modification of the vehicular lamp of FIG. 1.

FIGS. 1 to 3 illustrate a first embodiment of a vehicular lamp according to the present invention, wherein FIG. 1 is a frontal view of the vehicular lamp according to the first embodiment of the present invention, FIG. 2 is a cross-sectional view taken along a line I-I in FIG. 1, and FIG. 3 is a modification of the vehicular lamp of FIG. 2. Note that the terms front back, left, and right as used in the description below follow the directions of a vehicle, and leftward in FIG. 2 corresponds to the rearward direction of a vehicle.

As FIGS. 1 and 2 show, a vehicular lamp 10, serving as the first embodiment of the present invention, is a tail lamp provided on a rear end portion of a vehicle. The vehicular lamp 10 includes a lamp body 11 made of resin that is fixed to a vehicle body side and has a shape opening forward; a front cover 12 made of transparent resin that is attached from the front opening portion of the lamp body 11, and a lamp chamber 13 defined by the lamp body 11 and the front cover 12. Inside the lamp chamber 13, the vehicular lamp 10 further includes an inner lens 14, a plurality of LEDs 15 that are semiconductor light-emitting elements forming a lamp unit, a reflective plate 16 that is a millimeter wave direction-changing mechanism similar to the LED 15, and a millimeter wave radar 17.

The inner lens 14 is made of transparent resin and a front cover 12 side thereof is a flat plane. The inner lens 14 is attached to the rear side of the front cover 12 within the lamp chamber 13, and a back surface of the inner lens 14 on the LED 15 side is formed with respective upper and lower rows of dummy portions 18, 19. The dummy portions 18 on the upper side are projections with a quadrangular pyramid shape whose apex angle is on the rear side. There are a total of 80 dummy portions 18 arranged in rows of 20 in the horizontal direction and columns of 4 in the vertical direction. The dummy portions 19 on the lower side are projections with a quadrangular pyramid shape similar to that on the upper side. There are a total of 96 dummy portions 19 arranged projecting toward the rear side in rows of 24 in the lateral direction and columns of 4 in the longitudinal direction. Note that the dummy portions 18, 19 may be formed into a hemispherical shape that protrudes to the rear side, instead of a quadrangular pyramid shape.

The inner lens 14 is formed with a lens portions 20 between the upper and lower dummy portions 18, 19 and centered on an optical axis of the LED 15. The lens portion 20 is integrally formed with the inner lens 14 and has a planoconvex lens shape.

The upper-level LEDs 15 are attached aligned in a row of five in the horizontal direction between the upper dummy portion 18 and the lower dummy portion 19 of the inner lens 14. The lower-level LEDs 15 are attached aligned in a row of six in the horizontal direction below the lower dummy portion 19 of the inner lens 14.

The reflective plate 16 is formed into a generally conical shape using a member made of metal or a resin member made by depositing metal on a resin material. The reflective plate 16 is attached to the LED 15 in a concentric configuration so as to cover around the LED 15 with an apex portion thereof facing a rear plate 21 of the lamp body 11.

The millimeter wave radar 17 includes an antenna portion 22 for sending a millimeter wave of 76 GHz to 77 GHz, for example, and receiving a reflected millimeter wave; and a control portion 23 that controls a millimeter wave that was sent from the antenna portion 22 and impacted with an object and a reflected wave that was reflected by the object and received by the antenna portion 22.

For the millimeter wave radar 17, the control portion 23 is vertically attached to the lamp chamber 13 side of the rear plate 21 of the lamp body 11 rearward of the LED 15, and the antenna portion 22 is attached to the front surface of the control portion 23.

After receiving a reflected wave that was reflected from a rearward object during travel, the control portion 23 performs computational processing of a propagation time, a frequency deviation generated by the Doppler effect, and the like, whereby the control portion 23 measures a distance to the object and a relative speed to a host vehicle. The control portion 23 subsequently generates an electric signal for actively adjusting a host vehicle speed. A control operation is consequently performed by a control unit (not shown) that received the electric signal so as to maintain a constant distance with a following vehicle through adjustment of an accelerator opening angle and sending of a control signal or the like to deliver a warning to the following vehicle. Note that a control operation for measuring a distance to a rearward object or the like to avoid a collision with the object is also similarly performed when traveling in reverse.

In the vehicular lamp 10 as described above, the reflective plate 16 is arranged between the LED 15 and the millimeter wave radar 17. Therefore, when a control of the millimeter wave radar 17 is initiated, an omnidirectional millimeter wave is sent from the antenna portion 22 on the back surface side of the LED 15 and impacts the reflective plate 16. Hence, after reflection by the reflective plate 16, a millimeter wave D is given directionality and advances from between the five upper-level LEDs 15 and the six lower-level LEDs 15, then passes through the upper and lower dummy portions 18, 19 and the front cover 12, and is sent rearward of the vehicle. As a consequence, the millimeter wave D is not reflected toward the millimeter wave radar 17 side after reflection by the reflective plate 16, which makes it possible to keep reception noise down to a minimum. An emitted light a from the LED 15 is optically directed by the lens portion 20 to pass through the front cover 12 and radiate rearward of the vehicle.

After passing through the upper and lower dummy portions 18, 19 and the front cover 12 and being sent rearward of the vehicle, the millimeter wave D impacts and reflects off an object and returns. Consequently, the millimeter wave radar 17 receives through the antenna portion 22 a reflected wave Df, which returned after passing through the front cover 12 and the dummy portions 18, 19 of the inner lens 14. The control portion 23 then performs computational processing for the propagation time, the frequency deviation generated by the Doppler effect, and the like from the timing at which the millimeter wave D was sent until the timing at which the reflected wave Df was received. Thus, the distance to the object and the relative speed to a host vehicle are measured, and an electric signal for actively adjusting the host vehicle speed is generated.

Next, a modification of the vehicular lamp according to the present invention will be described with reference to FIG. 3.

As FIG. 3 shows, in the present modification, the millimeter wave radar 17 is attached to the outer side of the rear plate 21 of the lamp body 11 rearward of the LED 15, and the antenna portion 22 is attached to the front surface of the control portion 23. Therefore, the millimeter wave radar 17 is disposed hidden by the lamp body 11 so as to be invisible when viewed from the front.

In the present modification, when a control of the millimeter wave radar 17 is initiated, an omnidirectional millimeter wave is sent from the antenna portion 22 disposed on the outer side of the lamp body 11 and on the back surface side of the LED 15, which passes through the rear plate 21 of the lamp body 11 and impacts the reflective plate 16. Following reflection by the reflective plate 16, the millimeter wave D is given directionality and advances from between the upper-level LED 15 and the lower-level LED 15. Thus, the millimeter wave D passes trough the upper and lower dummy portions 18, 19 and the front cover 12, and is sent rearward of the vehicle.

As explained above, according to the vehicular lamp 10 of the first embodiment, the millimeter wave radar 17 is capable of using the reflective plate 16, which is a millimeter wave direction-changing mechanism, to send the millimeter wave D sent by the millimeter wave radar 17 from the back surface of the LEDs 15 via between the LEDs 15 to rearward of the vehicle. Thus, the millimeter wave radar 17 can be disposed on the back surface side within the lamp chamber 13 so as to be invisible when viewed from the front, and the millimeter wave D can be sent from a narrow opening rearward of the LED 15. Accordingly, it is simple to distribute space between the LED 15 and the millimeter wave radar 17, and space can be easily secured for the millimeter wave radar 17, thereby achieving a more compact vehicular lamp 10. A good design can also be achieved by making the millimeter wave radar 17 invisible when viewed from the front.

In addition, sending the millimeter wave D from the millimeter wave radar 17 through a narrow opening rearward of the LED 15 and giving the millimeter wave D directionality via the reflective plate 16 makes it possible to generate a millimeter wave D with directionality and dispose the millimeter wave radar 17 at the rear of the lamp chamber 13 where there is flexibility in terms of space.

Since the reflective plate 16 is provided between the plurality of LEDs 15 and the millimeter wave radar 17, the millimeter wave D sent from the millimeter wave laser 17 does not directly impact the LED 15, and the reflective plate 16 can efficiently give directionality to the millimeter wave D.

Also, by attaching the millimeter wave radar 17 to the outer side of the lamp body 11 rearward of the LED 15, it is possible to dispose the millimeter wave radar 17 in a manner that does not expose the millimeter wave radar 17 to the significantly increased temperature within the lamp chamber 13. As a consequence, the millimeter wave radar 17 can be disposed at a location unaffected by temperature fluctuations so as to protect the millimeter wave radar 17.

Second Embodiment

Figure 4:
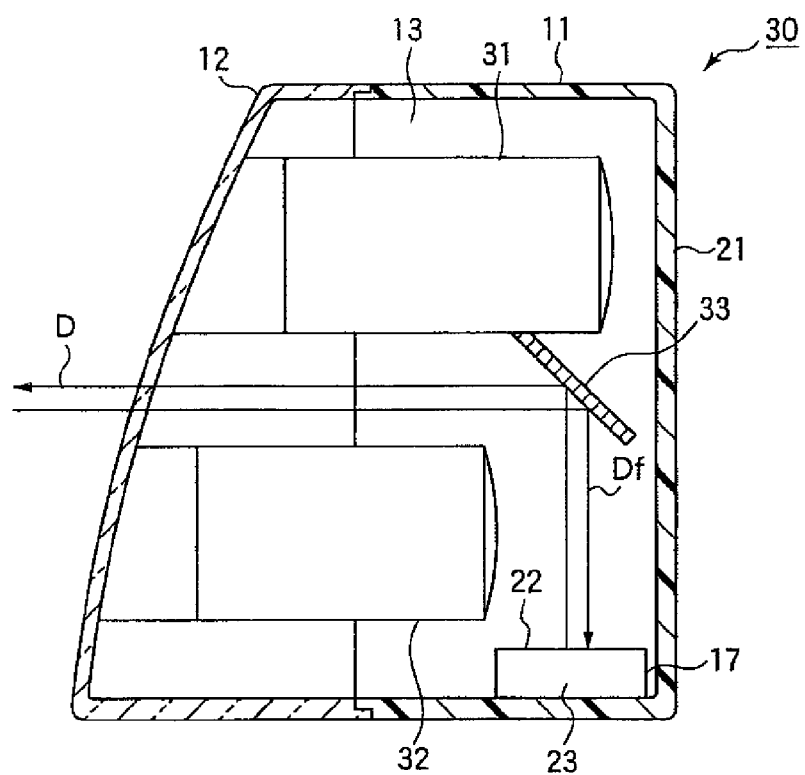
FIG. 4 is a horizontal cross-sectional view of a vehicular lamp according to a second embodiment of the present invention.

Next, a second embodiment regarding the vehicular lamp of the present invention will be described with reference to FIG. 4. FIG. 4 is a horizontal cross-sectional view of a vehicular lamp according to the second embodiment of the present invention. Note that for the following embodiments, like or equivalent symbols are used in the figures for structural elements that overlap with and/or are functionally similar to those in the above first embodiment in order to simplify or omit descriptions.

As FIG. 4 shows, a vehicular lamp 30, serving as the second embodiment of the present invention, includes within the lamp chamber 13 an outer-side light unit 31, an inner-side light unit 32, and a reflective plate 33. The outer-side light unit 31 is a lamp unit that accommodates an outer-side LED 15 in a sealed configuration. The inner-side light unit 32 is a lamp unit that accommodates an inner-side LED 15 in a sealed configuration. Also, the reflective plate 33 is a millimeter wave direction-changing mechanism that is attached between the outer-side light unit 31 and the inner-side light unit 32. In addition, the millimeter wave radar 17 is attached to a back inner-side portion of the lamp body 11.

In the vehicular lamp 30 of the present embodiment, the reflective plate 33 is arranged between the LED 15 and the millimeter wave radar 17. Therefore, after reflection by the reflective plate 33, the omnidirectional millimeter wave D sent from the antenna portion 22 of the millimeter wave radar 17 is given directionality and advances from between the outer-side light unit 31 and the inner-side light unit 32, then passes through the front cover 12 and is sent rearward of the vehicle.

The millimeter wave D that passed through the front cover 12 and was sent rearward of the vehicle impacts an object and is reflected off the object. The reflected wave Df that was reflected again passes through the front cover 12 and is reflected by the reflective plate 33, after which the reflected wave Df is received by the antenna portion 22 of the millimeter wave radar 17.

According to the vehicular lamp 30 of the second embodiment, the millimeter wave radar 17 is disposed on the inner-side portion of the lamp chamber 13 so as to be invisible when viewed from the front, and the millimeter wave D can be sent from a narrow opening rearward of the light units 31, 32. Thus, giving the millimeter wave D directionality via the reflective plate 33 makes it possible to generate a millimeter wave D with directionality and dispose the millimeter wave radar 17 on the inner-side portion of the lamp chamber 13 where there is flexibility in terms of space.

Third Embodiment

Figure 5:
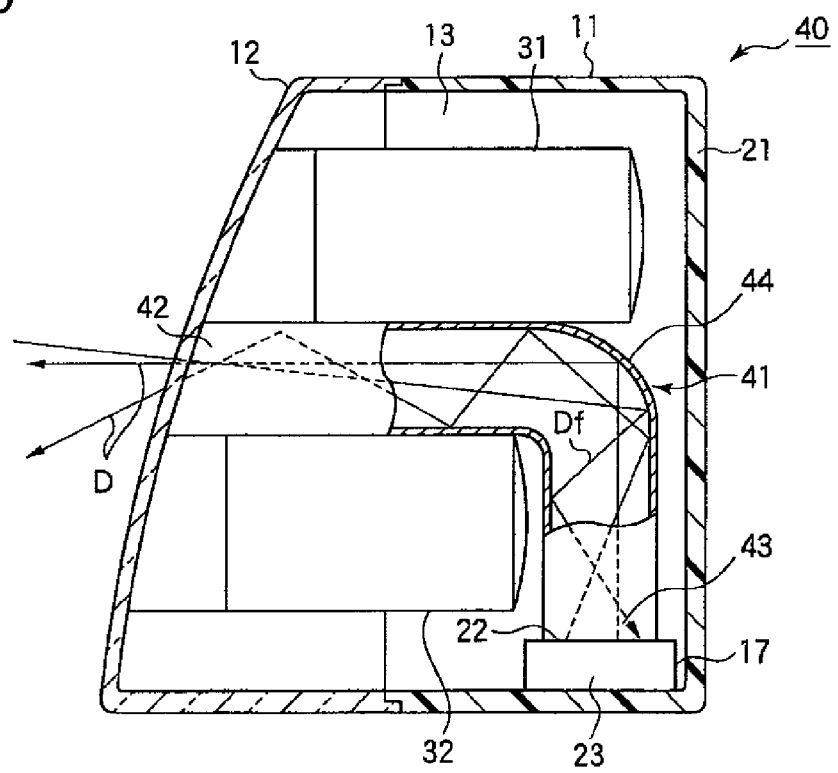
FIG. 5 is a horizontal cross-sectional view of a vehicular lamp according to a third embodiment of the present invention.

Next, a third embodiment regarding the vehicular lamp of the present invention will be described with reference to FIG. 5. FIG. 5 is a horizontal cross-sectional view of a vehicular lamp according to the third embodiment of the present invention.

As FIG. 5 shows, a vehicular lamp 40, serving as the third embodiment of the present invention, includes within the lamp chamber 13 the outer-side light unit 31, the inner-side light unit 32, and a waveguide 41. The outer-side light unit 31 is a lamp unit that accommodates an outer-side LED 15 in a sealed configuration. The inner-side light unit 32 is a lamp unit that accommodates an inner-side LED 15 in a sealed configuration. Also, the waveguide 41 is a millimeter wave direction-changing mechanism that is attached between the outer-side light unit 31 and the inner-side light unit 32. In addition, the millimeter wave radar 17 is attached to the back inner-side portion of the lamp body 11.

The waveguide 41 is formed into a hollow cylindrical shape using a member made of metal or a resin member made by depositing metal on a resin material. A distal end portion 42 of the waveguide 41 is attached between the outer-side light unit 31 and the inner side light unit 32. In addition, the waveguide 41 has a base end portion 43 mounted on the antenna portion 22 of the millimeter wave radar 17, and a curved portion 44 whose center is curved generally 90 degrees.

In the vehicular lamp 40 of the present embodiment, the omnidirectional millimeter wave D sent from the antenna portion 22 of the millimeter wave radar 17, which is disposed on the back surface side of the inner-side light unit 32, is repeatedly reflected off the inner surface of the waveguide 41 from the base end portion 43 of the waveguide 41, while at the same time passing through the curved portion 44, where the millimeter wave D is given directionality and advances toward the distal end portion 42. The millimeter wave D then passes through the front cover 12 from between the outer-side light unit 31 and the inner-side light unit 32, and is sent rearward of the vehicle.

The millimeter wave D that passed through the front cover 12 and was sent rearward of the vehicle impacts an object and is reflected off the object. The reflected wave Df again passes through the front cover 12 and enters the waveguide 41 from the distal end portion 42. The direction of the reflected wave Df is then changed by the curved portion 44, after which the reflected wave Df is received by the antenna portion 22 of the millimeter wave radar 17.

According to the vehicular lamp 40 of the third embodiment, the millimeter wave radar 17 is disposed on the back inner-side portion of the lamp chamber 13 so as to be invisible when viewed from the front, and the millimeter wave D is sent from a narrow opening rearward of the light units 31, 32 and given directionality by passing through the waveguide 41. Thus, a millimeter wave D with directionality can be generated. In addition, the millimeter wave radar 17 can be disposed on the back inner-side portion of the lamp chamber 13 where there is flexibility in terms of space.

Note that the present invention is not limited to the embodiments described above, and may be freely modified, improved, and so forth as appropriate. In addition, the structural elements used in the embodiments described above are not limited in terms of material, shape, dimension, value, form, number, layout, or the like, provided that any structural elements used are capable of achieving the present invention.

For example, the number of LEDs is not limited to the number shown in the figures, and the number of LEDs may be selected and set as appropriate depending on the design and desired amount of light. Obviously, the vehicular lamp may be also be applied to a headlamp instead of a tail lamp.

Accordingly, while description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS 10, 30, 40 Vehicular Lamp
11 Lamp Body
12 Front Cover
13 Lamp Chamber
15 Led (Lamp Unit)
16 Reflective Plate (Millimeter Wave Direction-Changing Mechanism)
17 Millimeter Wave Radar
33 Reflective Plate (Millimeter Wave Direction-Changing Mechanism)
41 Waveguide (Millimeter Wave Direction-Changing Mechanism)

What is claimed is:

1. A vehicular lamp comprising:
a lamp chamber formed by a lamp body opening forward and a transparent front cover attached to a forward opening portion thereof;
a lamp unit disposed within the lamp chamber;
a millimeter wave radar for sending a millimeter wave to reflect off of an object in order to detect a distance and a relative speed of the object; and
a millimeter wave direction-changing mechanism for sending forward the millimeter wave sent by the millimeter wave radar from a back surface side of the lamp unit, without reflecting the millimeter wave on a rearward side of the lamp unit.

2. The vehicular lamp according to claim 1, wherein the millimeter wave direction-changing mechanism comprises a reflective plate that reflects the millimeter wave sent by the millimeter wave radar.

3. The vehicular lamp according to claim 1, wherein the millimeter wave direction-changing mechanism comprises a waveguide that guides the millimeter wave sent by the millimeter wave radar.

4. The vehicular lamp according to claim 2, further comprising:
a plurality of arranged lamp units,
wherein the reflective plate is provided between the lamp units and the millimeter wave radar, and
wherein the millimeter wave sent by the millimeter wave radar is sent forward by the reflective plate via space between the lamp units.

5. The vehicular lamp according to claim 1, wherein the millimeter wave radar is disposed within the lamp chamber.

6. The vehicular lamp according to claim 1, wherein the millimeter wave radar is disposed outside the lamp chamber.

7. The vehicular lamp according to claim 2, wherein the millimeter wave radar is disposed on a side portion of the lamp chamber.

8. The vehicular lamp according to claim 3, wherein the millimeter wave radar is disposed on a side portion of the lamp chamber.

9. The vehicular lamp according to claim 8, further comprising:
a plurality of arranged lamp units,
wherein the waveguide comprises a curved portion that is curved generally 90 degrees between a first end and a second end,
wherein the waveguide is disposed such that the first end faces the millimeter radar and the second end faces the forward opening portion of the lamp chamber, and
wherein the millimeter wave sent by the millimeter wave radar is sent forward by the waveguide via space between the lamp units.

10. A method of manufacturing a vehicular lamp comprising:
forming a lamp chamber with a lamp body opening forward and a forward opening portion;
attaching a transparent front cover to a forward opening portion of the lamp chamber;
disposing a lamp unit within the lamp chamber;
disposing within the lamp chamber a millimeter wave radar for sending a millimeter wave to reflect off of an object in order to detect a distance and a relative speed of the object; and
disposing within the lamp chamber a millimeter wave direction-changing mechanism for sending forward the millimeter wave sent by the millimeter wave radar from a back surface side of the lamp unit without reflecting the millimeter wave on a rearward side of the lamp unit.

11. The method according to claim 10, wherein the millimeter wave direction-changing mechanism comprises a reflective plate that reflects the millimeter wave sent by the millimeter wave radar.

12. The method according to claim 10, wherein the millimeter wave direction-changing mechanism comprises a waveguide that guides the millimeter wave sent by the millimeter wave radar.

13. The method according to claim 11, further comprising:
disposing a plurality of lamp units within the lamp chamber; and
disposing the reflective plate between the lamp units and the millimeter wave radar, wherein the millimeter wave sent by the millimeter wave radar is sent forward by the reflective plate via space between the lamp units.

14. The method lamp according to claim 11, wherein the millimeter wave radar is disposed on a side portion of the lamp chamber.

15. The vehicular lamp according to claim 12, wherein the millimeter wave radar is disposed on a side portion of the lamp chamber.

16. The method according to claim 15, further comprising:
disposing a plurality of lamp units within the lamp chamber,
wherein the waveguide comprises a curved portion that is curved generally 90 degrees between a first end and a second end; and
disposing the waveguide such that the first end faces the millimeter radar and the second end faces the forward opening portion of the lamp chamber,
wherein the millimeter wave sent by the millimeter wave radar is sent forward by the waveguide via space between the lamp units.

17. A method of manufacturing a vehicular lamp comprising:
forming a lamp chamber with a lamp body opening forward and a forward opening portion;
attaching a transparent front cover to a forward opening portion of the lamp chamber;
disposing a lamp unit within the lamp chamber;
disposing outside the lamp chamber a millimeter wave radar for sending a millimeter wave to reflect off of an object in order to detect a distance and a relative speed of the object; and
disposing within the lamp chamber a millimeter wave direction-changing mechanism for sending forward the millimeter wave sent by the millimeter wave radar from a back surface side of the lamp unit, without reflecting the millimeter wave on a rearward side of the lamp unit.

* * * * *